March 14, 1967   W. H. HUGGINS ETAL   3,309,706
PHASED ARRAY SYSTEMS
Filed May 21, 1962   4 Sheets-Sheet 1

INVENTORS
DANIEL J. CROWLEY
BY   WILLIAM H. HUGGINS
ATTORNEY

TARGET DIRECTIONS

INVENTORS
DANIEL J. CROWLEY
WILLIAM H. HUGGINS
BY
ATTORNEY

INVENTORS
DANIEL J. CROWLEY
WILLIAM H. HUGGINS
BY
ATTORNEY

United States Patent Office 3,309,706
Patented Mar. 14, 1967

3,309,706
PHASED ARRAY SYSTEMS
William H. Huggins, Baltimore, Md., and Daniel J. Crowley, Needham, Mass., assignors to Sylvania Electric Products Inc., a corporation of Delaware
Filed May 21, 1962, Ser. No. 197,177
5 Claims. (Cl. 343—100)

This invention relates to phased array systems and more particularly concerns an improved technique for suppressing undesirable side lobe response of said systems.

As a result of the unique problems involved in the detection and tracking of small distant objects such as satellites and missiles, there has been considerable emphasis in recent years on the development of planar phased array radar systems. The size and speeds of these objects require scanning of a large volume of space with high precision, and it can be expected that the effective re-radiation cross-sections of such targets will be even smaller in the near future. Consequently, the operational requirements of phased array radars will become more demanding as time goes on.

The nature of the linear phased array and its operational characteristics are described in detail in an article by Wilhelm H. von Aulock entitled, "Properties of Phased Arrays," appearing at page 1715 of the October 1960 issue of Proceedings of the IRE. For purposes of understanding the present invention, only certain aspects of prior art phased arrays will be reviewed, with attention invited to this article for a more rigorous treatment of the subject. Briefly, the direction of the main beam from a phased array radar system is a function of the phase differential between multiple signals being fed into the array of antenna elements. When the signals are all in phase the transmitted beam is normal to the array, and pointed in the so-called boresight direction. To change the pointing direction the signals applied to the multiple element channels are shifted in phase to produce a linear phase taper across the array. The relation between beam direction and the linear phase taper between adjacent channels is given by the expression $$\phi = 2\pi \frac{d}{\lambda} \sin \theta$$

where $\phi$ is the phase difference in radians between adjacent antenna elements, $d/\lambda$ is the spacing between antenna elements in wavelengths, and $\theta$ is the angle of the beam measured from the boresight direction. A suitable beam steering unit, which may include a battery of phase shifters, one for each channel element, electronically produces a varying phase taper which causes the transmitted beam to scan through a sector of interest.

During reception, the signal received by each element of the array, consisting of information and random noise components, is preamplified and mixed with a local oscillator signal to an intermediate frequency as shown in the receiver block diagram of FIG. 1. Ordinarily, the signal-to-noise ratio, $S/N$, of each IF output is much less than one. In order to detect the information through the noise, each IF output signal is coupled through a phase shifter where it undergoes the same phase shift experienced by the transmitted signal. Since the phase taper between the transmitted and received signals is the same, the information signals present in the complex output of the unit are all in phase, but the random noise components in the channels are not correlated. The plural outputs of the beam-steering unit are then added by a suitable beam summation network, and since the information components add directly whereas the noise components do not, the output signal from the beam summation network contains primarily target information.

The signal response characteristic of a typical linear phased array radar system is shown in FIG. 2 where the amplitude of the beam summation signal is plotted against the angular displacement of a target from the direction of the main beam. Hereinafter the term "linear phased array" refers to a phased array in which the amplitude of element channel signal outputs are proportional to signal amplitudes received by the antenna elements. This is an undesirable property of the system, since if the intensity of the target signal increases, the overall amplitude of the signal response of FIG. 2 is correspondingly increased and, conversely, if the intensity of the received signal decreases, the overall amplitude response is reduced. As shown in FIG. 2, the response of a linear phased array has a maximum in the direction of the main beam and a number of undesirable side lobes. Because of these two properties—a response characteristic which is a function of target strength, and the existence of side lobes—the linear phased array radar may present erroneous information about targets within range of the system. The erroneous presentation of target information can best be explained by the following examples.

Referring to FIG. 3, assume two targets at different ranges are scanned by a linear phased array system of FIG. 1, one a near target at azimuth bearing $\theta_A$ and the other a more distant target at azimuth bearing $\theta_B$. Because the targets are displaced in range, the response characteristic of the system changes as the main beam direction is changed from one target to the other. Curve A represents the response at the instant the main beam is directed at the target at $\theta_A$, and curve B is the response at the instant the beam points in the direction of the target at $\theta_B$. The closest target returns the strongest target signal, giving rise to the more intense response shown by Curve A. At the instant the main beam has an azimuth bearing $\theta_A$, the target at azimuth $\theta_A$ is within the main beam and the target at $\theta_B$ is in a side lobe. The beam summation network, in response to the two target return signals, produces two peak output signals, one of amplitude A' and the other of amplitude A". The two target signals are processed by the system and may be registered as "pips" along the radial sweep of a plan position indicator (P.P.I.) display scope (FIG. 3A). Since the sweep of the scope is synchronized with the pointing direction of the main beam, the two targets would be presented as shown in the scope display of FIG. 3A at time $t_1$ and at azimuth $\theta_A$. Although the true azimuth of one of the targets is $\theta_B$, the system has no way of distinguishing between the registration of true and false target information and the operator or signal processing equipment is thus misled into registering both targets as true targets at azimuth bearing $\theta_A$.

Similarly, at a later time $t_2$ when the antenna beam has an azimuth direction of $\theta_B$ the same two targets are again within range of the system. The weaker target at azimuth $\theta_B$ is received by the main beam signal, whereas, the target at $\theta_A$ is received by the side lobe. The beam summation network, in response to the two target signals, produces two peak output signals, one signal of amplitude B' and the other signal of amplitude B". Again the signals are processed and simultaneously registered on the face of a display scope at azimuth heading $\theta_B$, as shown in FIG. 3B. Since target B' is received by the main antenna beam this is the true target. Target "pip" B", on the other hand, is false. Again, the system has no way of distinguishing between true and false target registration.

A primary object of the present invention is to provide a phased array receiving system capable of distinguishing between targets which may simultaneously appear in the main beam and in a side lobe of the radiation pattern of a phased array system.

A more specific object of the invention is to provide an improved phased array receiving system, the system response of which is normalized and which rejects target information received outside the main beam of the antenna.

These objects are attained, in accordance with the present invention, by normalizing the beam summation signal of the system by limiting well down into channel noise the signals in each of the element channels of the array prior to beam summation and thereafter passing the resulting fixed amplitude beam summation signal through a threshold circuit whose level is set to reject the side lobe components of the signal but to pass the mean beam component.

More specifically, each element channel signal is mixed to an intermediate frequency, the spectrum of which includes a carrier and a number of side bands. After amplification, the IF signal is applied to hard limiter which is set to limit the input signal to a level less than the amplitude of the weakest signal received by the element channel, and thus converts the signal to a train of rectangular pulses. To eliminate undesirable harmonics of the fundamental signal which result from the limiting action, each hard-limited signal is passed through a narrow bandpass filter whose pass band is just wide enough to pass the fundamental signal but not the multiple harmonics thereof. The phase transfer characteristic of the limiters and filters in the element channels should be nearly identical to minimize distortion of the phase taper across the array. Since the relative phase of the signals in the element channels containing the hard limiters is the same as the relative phase of the signals received by the antenna elements, the signals can be weighted according to any desired antenna illumination taper, phase shifted and added together to form a beam in the same manner as in the beam-forming networks of a linear phased array system. The signal resulting from beam-forming in the present array, however, is different from that in a linear array. As a result of having the signal in each element channel normalized in amplitude, the main beam signal is also normalized; that is, the amplitude of the main beam signal is a function only of target direction and not of target strength.

The normalized character of the main beam signal permits a total rejection of the targets received by the side lobes. The main beam response of the array to a target in a side lobe direction is known to be equal to the normalized antenna pattern in that direction. Therefore, by applying the beam signal to a threshold device set to pass signals just greater than the maximum side lobe response of the normalized antenna pattern, target information received in the side lobes is rejected and only target information in the main beam is processed by the rest of the system. Thus, the present invention eliminates all signals received by the side lobes and allows only true target information to be processed.

Other objects, features, and advantages of the invention will become apparent from the following detailed description, taken in conjunction with the accompanying drawings, in which.

Figure 1:
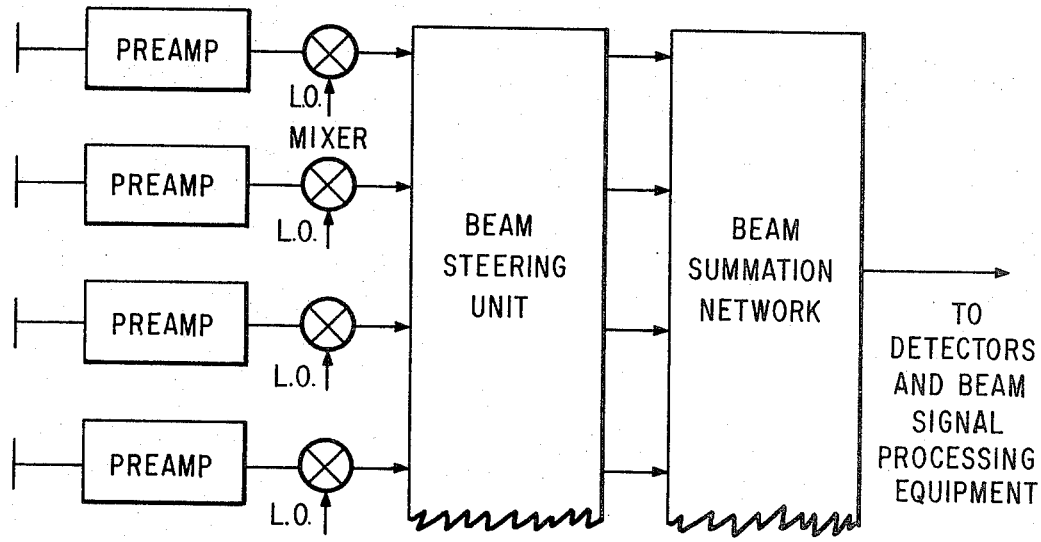
FIG. 1 is a block diagram of a prior art linear phased array radar system to which reference has already been made.
Figure 2:
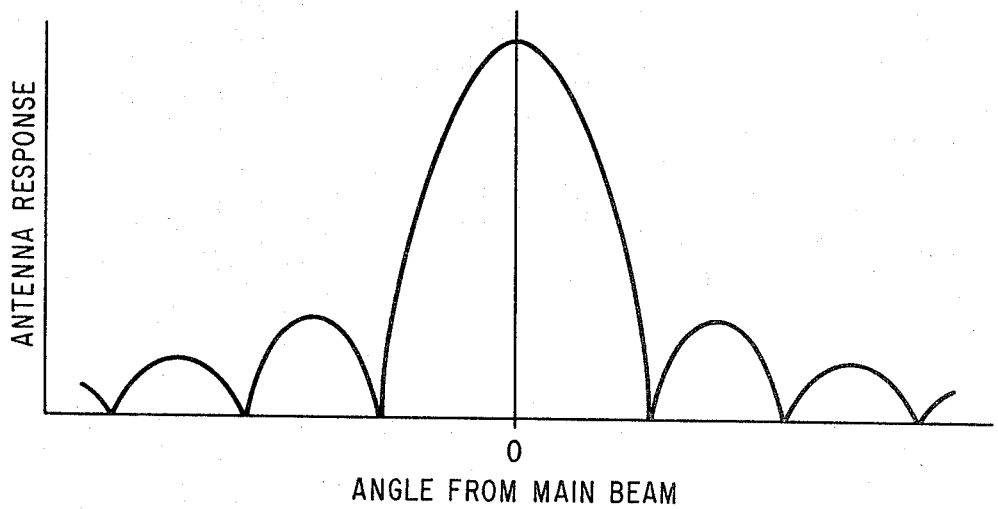
FIGS. 2, 3, 3A and 3B depict response characteristics of the prior art system of FIG. 1 and illustrate the nature of the problem solved by the present invention.
Figure 5:
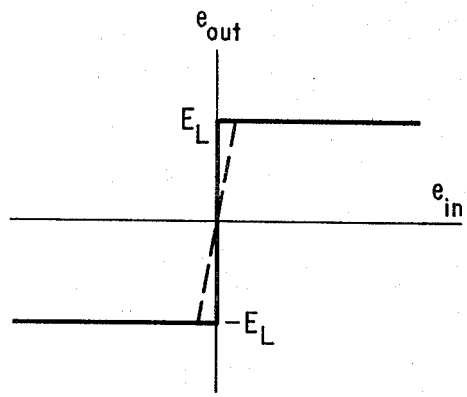
FIG. 5 depicts the transfer function of a hard limiter, a characteristic important to the operation of the system of FIG. 4.
Figure 4:
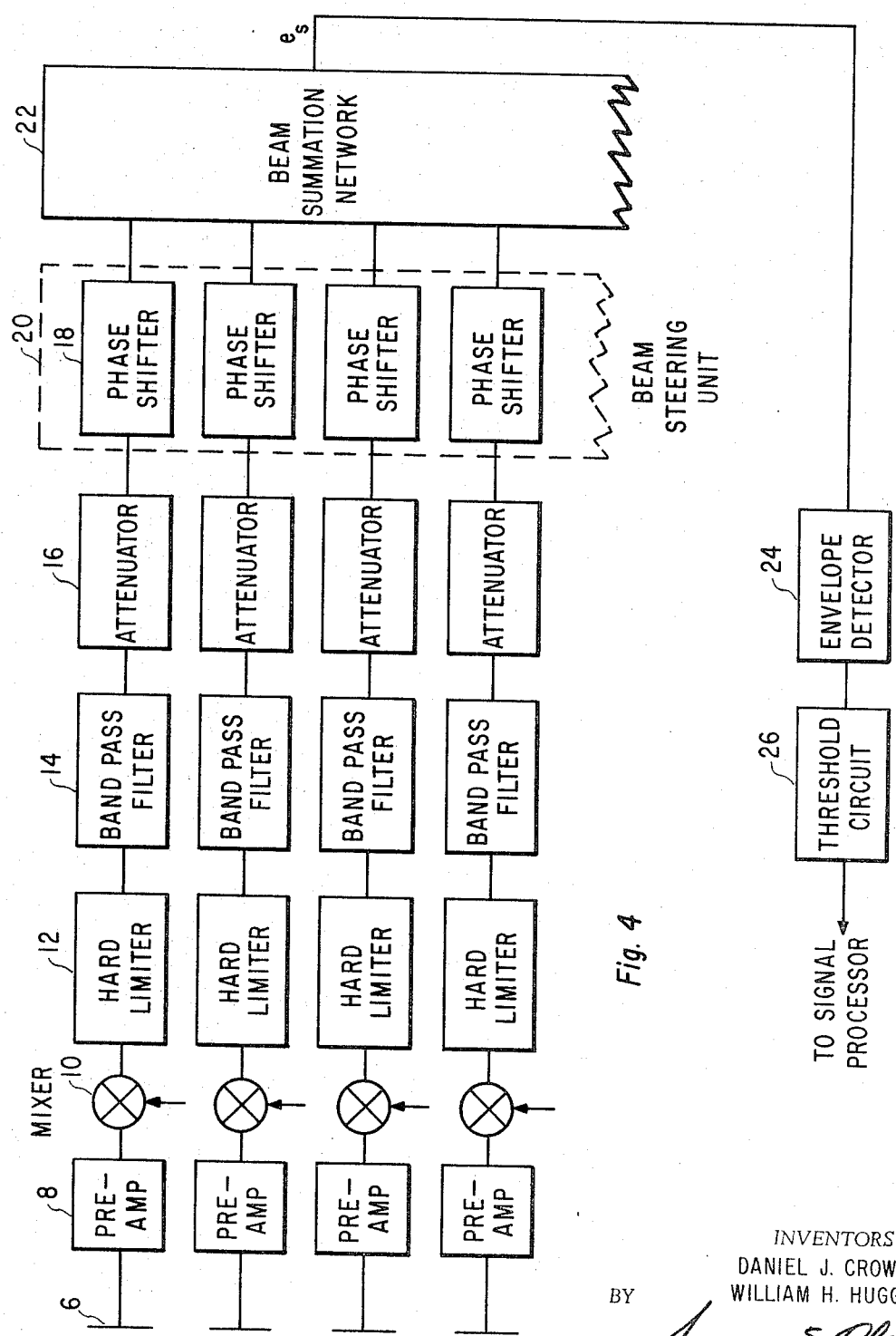
FIG. 4 is a block diagram of a phased array system embodying the present invention.

Referring now to FIG. 4, the present phased array is similar to the linear phased array of FIG. 1 in that it includes a plurality of antenna elements 6 (only four of which are shown), a pre-amplifier 8 for each element, and a mixer 10 in each channel to derive an IF frequency. However, the present system includes a hard limiter in each signal channel to normalize the amplitude of the received signals consequently to normalize the overall amplitude response to all targets within range of the system. More specifically, the IF signal from the mixer 10 in each channel is applied to a hard limiter 12, which may take a variety of forms, it being important only that it have a transfer characteristic of the type shown in FIG. 5; namely, that it produce a constant positive output signal of voltage $+E_L$ for input signals of positive polarity and a constant negative output signal of voltage $-E_L$ for input signals of negative polarity. This transfer characteristic can be achieved, for example, by the combination of a non-inverting very high gain amplifier followed by a diode clipping circuit, the amplifier giving steep slopes to the transfer curve and the clipper limiting the output signal to a constant voltage level. Since the gain of a practical amplifier for small input signals is finite, it is difficult to realize the ideal transfer characteristic shown by the solid line, the actual realizable characteristic being shown by the dotted line which, it will be noted, has a finite slope in the region of the origin.

The transmitted and received signals of the radar are pulsed sinusoids of radio frequency, each pulse consisting of a carrier signal and its side bands. For purposes of this discussion, the combination of a carrier signal and its side bands will be referred to as the fundamental signal. The fundamental signal received by an antenna element 6 is reduced in frequency by mixer 10 and applied to the limiter 12. If the limiting voltage $E_L$ of the limiter is less than the amplitude of the weakest IF output signal from the mixer (corresponding to the weakest signal receivable by the system) the peaks of the IF sine wave signal are squared to produce a train of rectangular pulses. An analysis of the frequency spectrum of the rectangular wave train would show it to consist of the fundamental signal and a number of harmonics. Since the fundamental signal is all that is needed, the output of limiter 12 is applied to a narrow band filter 14 whose pass band is adjusted to pass only the fundamental signal and to reject all harmonics.

As was stated earlier, the phase transfer characteristic of the limiters and filters in the element channels should be nearly identical to minimize distortion of the phase taper across the array. This is also true of the other units in the element channels, namely, elements 6, 8 and 10, as in a conventional phased array. Finally, since the filters pass only the limited fundamental signal, and introduce no appreciable phase shift between adjacent channels, the output signals from filters 14 are pulsed sinusoids, similar to the originally received signals, except that they are of a constant normalized amplitude $E_L$, and are relatively free of noise.

As a result of the preservation of the relative phase differential of target signals through the element channels, the signals derived from filters 14 can be weighted according to any desired illumination function. This concept is well known in the linear phased array art, a Taylor distribution being frequently used, in which the signals from the elements near the center of the array are weighted more heavily than the signals from elements at the edges of the array, the object being to minimize the side lobes of the radiation pattern. The desired illumination function is achieved by a plurality of attenuators 16, one in each element channel, which may be adjusted to give minimum attenuation to center element signals and progressively greater attenuation to signals in the element channels to either side of center. The output signals from the attenuators are applied to a beam-steering unit 20, including a phase-shifter 18 in each element channel, the individual phase-shifters being adjusted to give the same phase taper across the array as that produced by the transmitter of the system. In this respect, the signal processing is the same as would be done in IF beam-forming for a linear phased array.

The output signals from the beam-steering unit are added together in beam summation network 22, which may be a resistor matrix, to form a beam signal $e_s$. The beam signal $e_s$ is significantly different from that appearing at the output of the summation network of the linear phased array radar of FIG. 1, in that as a result of normalization of the amplitudes of the signals in the element channels, the amplitude of the beam channel signal is also normalized. That is, the amplitude of the main beam and side lobe components of the signals are constant for high and low intensity target signals and the response characteristic therefore is a function only of target direction and is independent of target strength.

Figure 6:
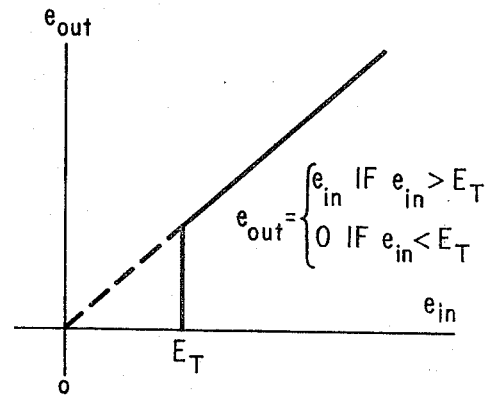
FIG. 6 depicts the transfer characteristic of the threshold device employed in the system of FIG. 4.
Figure 7:
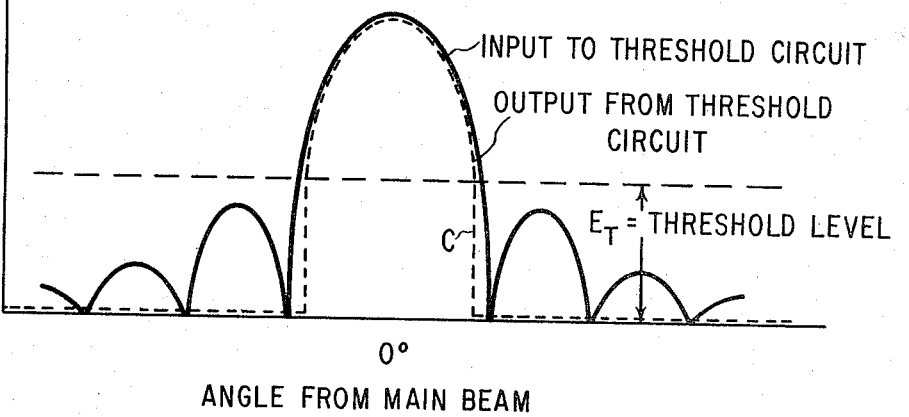
FIG. 7 illustrates the manner in which the threshold device rejects target signals received in the side lobes of the radiation pattern.

The envelope of the beam channel signal $e_s$ is detected by a suitable envelope detector 24 and thereafter applied to a threshold circuit 26 having a transfer characteristic of the type shown in FIG. 6. As shown, the threshold circuit produces no output for input signals of amplitude below the voltage level $E_T$ and produces an output signal equal in amplitude to the input signal for signals greater than the level $E_T$. Because of the normalization of the beam signal $e_s$, the main channel response of the antenna to a target in a side lobe direction is known to be equal to the normalized antenna pattern in that direction. Thus, if the voltage level $E_T$ of the threshold circuit is set to be just above the level of the maximum side lobe response of the normalized antenna pattern, as shown in FIG. 7, the side lobe components of the beam signal are rejected and only the main beam component appears at the output of threshold circuit 24. That is, a target will be completely rejected if it is in any direction in the side lobe region, but will be retained if it is located within the main beam. This side lobe rejection is illustrated in FIG. 7, the dotted curve C representing the antenna pattern response as seen at the output of the threshold circuit.

Figure 3:
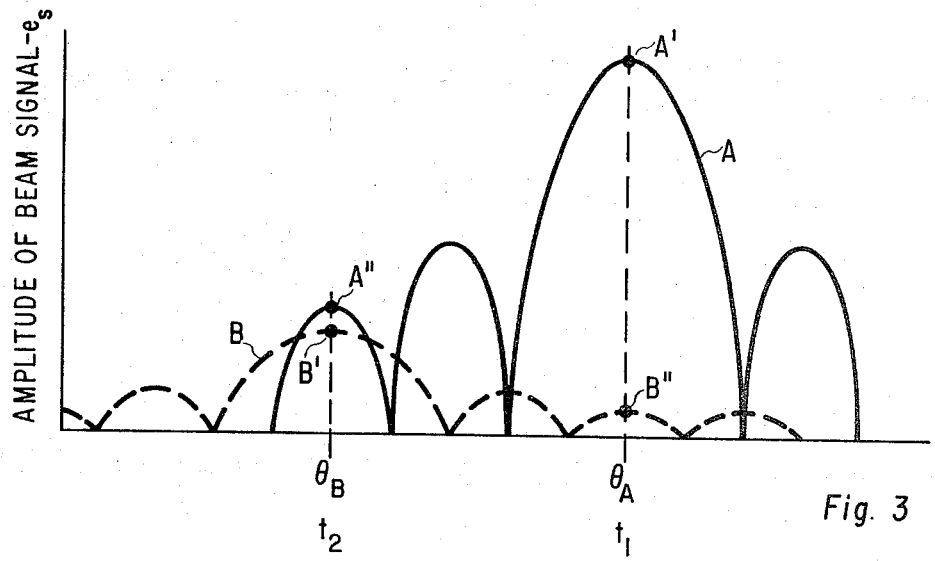
Figure 3B:
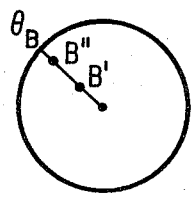
Figure 3A:
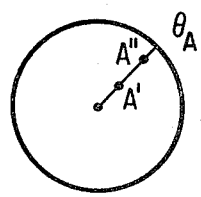
Figure 8:
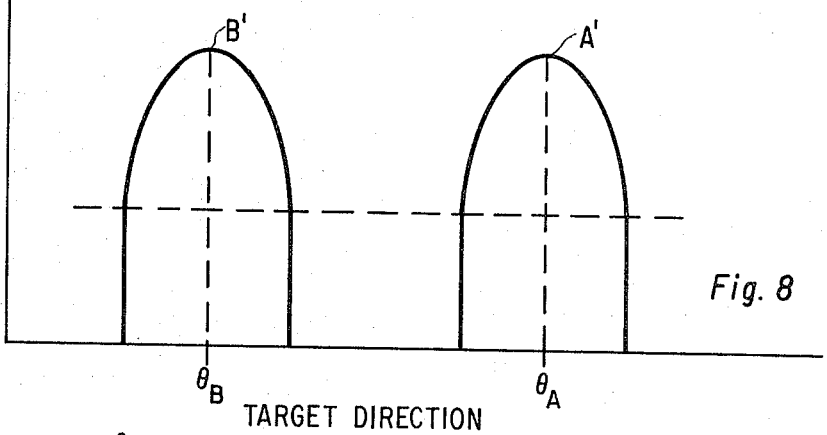
FIGS. 8, 8A and 8B illustrate the response of a phased array receiving system employing the invention when scanned across two targets of the character shown in FIG. 3.
Figure 8B:
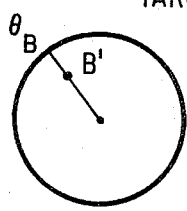
Figure 8A:
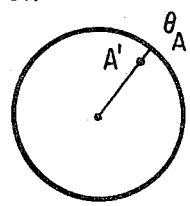

When the phased array receiving system employing the present invention is scanned across the two non-coincident targets in the example of FIG. 3, the output of threshold circuit 26 would be similar to that shown in FIG. 8. Because of hard-limiting the amplitude of the main beam and side lobe components of the stronger target signal (target at $\theta_A$) and the weaker target signal (target at $\theta_B$) transmitted from the element channels into the beam summing network 22 would be equal; and the side lobe responses of both targets would be suppressed. The equality of the two target signals at the output of beam summing network 22 allows the threshold circuit 20 to be set to a fixed level $E_T$ to reject side-lobe response. Thus, for two target signals, the output of the threshold circuit 26 would consist of two main beam signals, one of amplitude $A'$ when at time $t_1$ the main antenna beam has an azimuth bearing of $\theta_A$, and the other of amplitude $B'$ when at time $t_2$ the main antenna beam has an azimuth direction of $\theta_B$. If these targets were displayed on the P.P.I. presentation of FIG. 8A, the signal $A'$ representing the echo return from the strong target would appear on the radial sweep at the time it has an azimuth bearing of $\theta_A$. Since at this time $t_1$ there is no signal component in the output of threshold circuit 26 representing the weaker target at $\theta_B$, the system presents no false target "pips." Likewise, at time $t_2$ when the main beam is in the direction of the weaker target at azimuth bearing $\theta_B$, only one signal appears at the output of the threshold circuit, that being a main beam pulse signal of amplitude $B'$. As shown in FIG. 8B, signal $B'$ is the only "pip" appearing on the radial sweep when its bearing is $\theta_B$ because the false target information returned by the side lobes of the system, being below the threshold level $E_T$, is suppressed.

It can be seen from the foregoing that applicants have provided an improved phased array receiving system wherein normalization of the response of the system permits rejection of the misleading false target information received by the side lobe fields. The target signals in each of the element channels is hard limited, and the limited signals when summed produce a signal response characteristic which is constant and independent of target strength. Since the system amplitude response to any target signal is constant, the side lobes can be totally rejected by passing the target signal through a threshold circuit whose threshold level is just greater than the largest side lobe level. By rejecting the side lobe, the system passes only true target information contained in the main beam of the antenna.

While there has been described what is, at present, considered a preferred embodiment of the invention, it will be apparent to ones skilled in the art that many modifications may be made without departing from the true spirit of the invention. For example, all element channel processing could be done at the transmitted frequency rather than at intermediate frequency, should this be desirable in a particular application. Further, threshold circuit 26 may be arranged to operate directly on the beam signal, without envelope detection, should this be desired. It will also be understood that although the invention has been described in terms of a one-dimensional array, it can be readily applied to a two-dimensional array wherein the elements 6 are arranged in rows and columns. It is intended, therefore, that the invention not be limited to what has been shown and described but only to the extent that such limitations appear in the appended claims.

What is claimed is:

1. A phased array of signal receiving system comprising a plurality of spatially disposed signal receiving elements, a signal processing channel coupled to each of said receiving elements, each of said channels including means for limiting the signal therein and producing a fixed amplitude output signal, means for combining the output signals from all of said channels to produce a beam signal, and a threshold circuit to which said beam signal is applied, said threshold circuit being operative to reject beam signals below a selected level and to produce an output signal of amplitude proportional to the amplitude of beam signals whose amplitude exceeds said selected level.

2. A phased array signal receiving system comprising a plurality of signal receiving elements arranged in an array, individual signal processing channels connected to corresponding receiving elements each including means for hard-limiting the signal therein to produce a fixed amplitude output signal independent of the amplitude of the signal received by its respective element, means for summing the output signals from all of said channels to produce a beam signal normalized in amplitude, and a threshold circuit to which said beam signal is applied, said threshold circuit being operative to block signals below a selected level and to produce an output signal of amplitude proportional to the amplitude of beam signals whose amplitude exceeds said selected level.

3. A phased array system comprising a plurality of signal sensing elements spatially arranged for a radiation pattern having a main beam and side lobes, a signal processing channel coupled to each of said elements, each of said channels including means for limiting the signal therein and producing a fixed amplitude output signal independent of the amplitude of the signal received by its respective sensing element, means for summing the output signals from all of said channels to produce a beam signal, and a threshold circuit to which said beam signal is applied, said threshold circuit being operative to reject beam signals below a fixed level representative of signals received in said side lobes and to produce an output signal of amplitude proportional to the amplitude of beam signals whose amplitude exceeds said fixed level.

4. A phased array signal receiving system comprising an array of a plurality of spatially arranged signal sensing elements having a radiation pattern consisting of a main beam and side lobes; a signal processing channel coupled to each of said elements, each of said channels including: a mixer for reducing the frequency of received signals to an intermediate frequency, means to which said intermediate frequency signals are applied for hard-limiting the signal to produce output signals of fixed amplitude independent of the magnitude of the signal received by its respective sensing element, and a band pass filter to which said output signals are applied; means for combining the output signals from all of said filters to produce a beam signal also normalized in amplitude, and a threshold circuit to which said beam signal is applied, said threshold circuit being operative to reject beam signals below a fixed level representative of maximum signals receivable in the side lobes of said radiation pattern and to produce an output signal of amplitude proportional to the amplitude of beam signals whose amplitude exceeds said fixed level.

5. A signal receiving system comprising a plurality of signal receiving elements arranged in an array to provide a radiation pattern consisting of a main beam and side lobes; a signal processing channel coupled to each of said elements, each of said channels including: means for symmetrically hard-limiting the signal therein to produce an output signal consisting of a fundamental frequency and harmonics thereof and having a fixed amplitude independent of the amplitude of the signal received by its respective element, a band pass filter to which said output signals are applied, said filter being operative to pass said fundamental frequency and to reject harmonics thereof, and an attenuator, each attenuator being operative to attenuate its respective signal in a predetermined relationship to the others to produce a desired illumination function; means for combining the output signals from all of said attenuators to produce a beam signal also normalized according to amplitude; and a threshold circuit to which said beam signal is applied, said threshold circuit being arranged to reject beam signals below a fixed level representative of maximum signals receivable in the side lobes of said radiation pattern and to produce an output signal of amplitude proportional to the amplitude of beam signals whose amplitude exceeds said fixed level.

References Cited by the Examiner
UNITED STATES PATENTS 3,094,695 6/1963 Jahn _____ 343—100
3,237,195 2/1966 Schiffman _____ 343—112

CHESTER L. JUSTUS, *Primary Examiner.*

M. KRAUS, H. C. WAMSLEY, *Assistant Examiners.*